(12) United States Patent
Povalac et al.

(10) Patent No.: US 9,811,220 B2
(45) Date of Patent: Nov. 7, 2017

(54) SIGNAL ADAPTIVE FILTERING FOR TOUCH DETECTION

(71) Applicant: Freescale Semiconductor, Inc., Austin, TX (US)

(72) Inventors: Karel Povalac, Valasska Polanka (CZ); Petr Gargulak, Lidecko (CZ); Lukas Vaculik, Valasske Mezirici (CZ)

(73) Assignee: NXA USA, Inc., Austin, TX (US)

( * ) Notice: Subject to any disclaimer, the term of this patent is extended or adjusted under 35 U.S.C. 154(b) by 321 days.

(21) Appl. No.: 14/744,310

(22) Filed: Jun. 19, 2015

(65) Prior Publication Data

US 2016/0370894 A1 Dec. 22, 2016

(51) Int. Cl.
G06F 3/044 (2006.01)
G06F 3/041 (2006.01)
G06F 3/0354 (2013.01)

(52) U.S. Cl.
CPC .......... *G06F 3/044* (2013.01); *G06F 3/03545* (2013.01); *G06F 3/03547* (2013.01);
(Continued)

(58) Field of Classification Search
CPC ...... G06F 3/0416; G06F 3/0418; G06F 3/044; G06F 3/03545; G06F 3/03547; G06F 2203/04106; G06F 2203/04808
See application file for complete search history.

(56) References Cited

U.S. PATENT DOCUMENTS 8,040,142 B1 * 10/2011 Bokma ................ H03K 17/955
324/658
8,248,084 B2 8/2012 Bokma et al.
(Continued)

FOREIGN PATENT DOCUMENTS

CN 102855032 A 1/2013
CN 104423753 A 3/2015
(Continued)

OTHER PUBLICATIONS

Extended Search Report for the International application No. EP 16174259.8 dated Nov. 2, 2016.

*Primary Examiner* — Ryan A Lubit (57) ABSTRACT

A signal adaptive filtering technique for recognizing touch and release events as indicated from a measured capacitance signal received from a capacitive touch sensor device in order to improve electromagnetic noise immunity, event detection responses, adaptability to dynamically changing environments, and adaptability to signal sensitivity changes and signal offset over an extended period of time. A capacitive touch sensor system may include one or more capacitive touch sensor devices, each sending a measured capacitance signal that outputs a baseline capacitance signal during a release event, and outputs an increased capacitance signal during a touch event. The system updates the baseline capacitance signal with a filter, wherein a transfer function of the filter varies as a function of a current state of the capacitive touch sensor device, determines a range of capacitance values calculated from the baseline capacitance signal in which a recognition of the touch event will not be performed, creates a predicted signal from a filtered version of the measured capacitance signal, and recognizes a touch or release event from a comparison of the measured capacitance signal to the predicted signal.

20 Claims, 8 Drawing Sheets

(52) U.S. Cl.
CPC .......... *G06F 3/0416* (2013.01); *G06F 3/0418* (2013.01); *G06F 2203/04106* (2013.01); *G06F 2203/04808* (2013.01)

(56) References Cited

U.S. PATENT DOCUMENTS

| | | | |
|---|---|---|---|
| 8,797,049 B2* | 8/2014 | Pedersen | G01R 27/26 178/18.06 |
| 2006/0221061 A1* | 10/2006 | Fry | G06F 3/0418 345/173 |
| 2006/0267953 A1* | 11/2006 | Peterson, Jr. | G06F 3/0418 345/173 |
| 2006/0279553 A1* | 12/2006 | Soss | G06F 3/0414 345/173 |
| 2008/0062151 A1* | 3/2008 | Kent | G06F 3/0418 345/177 |
| 2008/0158182 A1* | 7/2008 | Westerman | G06F 3/044 345/173 |
| 2013/0176272 A1* | 7/2013 | Cattivelli | G06F 3/041 345/174 |
| 2014/0125623 A1* | 5/2014 | Atkinson | G06F 3/044 345/174 |
| 2014/0278173 A1* | 9/2014 | Elia | G01R 35/007 702/65 |

FOREIGN PATENT DOCUMENTS

| | | |
|---|---|---|
| KR | 20140063018 A | 5/2014 |
| WO | 2014/020380 | 2/2014 |
| WO | 2014/020380 A1 | 2/2014 |

\* cited by examiner

SIGNAL ADAPTIVE FILTERING FOR TOUCH DETECTION

TECHNICAL FIELD

The present disclosure relates in general to capacitive touch sensor systems and techniques, and in particular, to improved touch detection techniques for capacitance sensor interfaces.

BACKGROUND INFORMATION

Capacitive touch sensor systems are used to implement a variety of useful functions, including touch sensor devices (e.g., touch pad, touch dial, touch wheel, etc.), for determining the presence of an object, accelerometers, other functions. Capacitive touch sensor devices have been incorporated into a range of electronic devices, including mobile communication devices, such as cellular telephones, computers, portable entertainment devices, appliances, and touch screens, to name but a few. A capacitive touch sensor system includes one or more capacitive touch sensor devices, each of which is configured to indicate a capacitance change when, for example, the sensor device is touched (e.g., by a stylus or a human finger). Such changes in capacitance may then be processed by the system in order to detect when the sensor device has been touched.

In a conventional capacitive touch sensor system, a capacitance of the sensor device is sampled, and a baseline value is subtracted from the sampled value to derive a delta value. The delta value is then compared to a threshold value. If the delta value is greater than the threshold value, then a touch is detected, whereas if the delta value is less than the threshold value, then no touch is detected.

In order to accommodate for changes in ambient operating conditions and sensitivity changes, it may be important to dynamically update the baseline value. However, applications of capacitive touch sensor systems are often subjected to large amounts of electromagnetic noise effects, which can cause significant disturbances to the sampled capacitance signal. Specifically, such disturbances can cause noise-related fluctuations in the sampled capacitance signal. Such noise fluctuations can result in the delta value for the sampled signal dipping below the threshold value during a touch event, giving a false "not touch detected" reading. Such false "not touch detected" readings result in inappropriate tracking of the baseline value to the sampled signal value during a touch event. As a consequence, the baseline value is inappropriately increased, increasing the vulnerability of the touch sensing components to noise fluctuations, and reducing the ability of a capacitive touch sensor device to accurately detect touches.

In order to minimize the effects of electromagnetic noise, filtering may be applied to the sampled data prior to deriving the delta value. However, such filtering can reduce the sensitivity of the capacitive touch sensor device components, making setting of the threshold value difficult for reliable touch recognition.

DETAILED DESCRIPTION

Aspects of the present invention implement signal adaptive filtering techniques for recognizing touch and release events as indicated from a measured capacitance signal received from a capacitive touch sensor device. Such techniques provide for a capacitive touch sensor system with improved electromagnetic noise immunity, improved event detection responses, improved adaptability to dynamically changing environments in which the touch capacitive sensing system is utilized, and improved adaptability to signal sensitivity changes and signal offset over an extended period of time.

Capacitive sensing is a technology, based on capacitive coupling, which takes the capacitance of whatever is touching the sensor (e.g., the human body or a stylus) as input. Capacitive touch sensor devices may be constructed from many different media, such as copper, indium tin oxide, and printed ink. Two types of capacitive touch sensor systems are (1) mutual capacitance systems, whereby the object (e.g., human finger or conductive stylus) alters the mutual coupling between row and column electrodes, which are scanned sequentially, and (2) self- or absolute capacitance systems, whereby the object loads the sensor or increases the parasitic capacitance to a ground potential. In both cases, the difference of a preceding absolute position from the present absolute position yields the relative motion of the object or human finger on the touch sensor device during that time. Embodiments of the present invention implement techniques for more accurately recognizing, or detecting, touch and release events, regardless of the type of hardware utilized for the capacitive touch sensor device. Within this disclosure, recognizing and detecting of touch and release events may be used interchangeably and synonymously.

Within embodiments of the present invention, a "touch event" may be defined as the period of time during which a user of a user interface device (implementing a capacitive touch sensor system comprising one or more capacitive touch sensor devices) intends that the user interface detect a touching of an object (e.g., human finger or stylus) to a particular location on the user interface (wherein the particular location is associated with a single capacitive touch sensor device). Within embodiments of the present invention, a "release event" may be defined as the period of time during which a user of the aforementioned user interface device intends that the user interface not detect a touching of the object to a particular location on the user interface (wherein the particular location is associated with a single capacitive touch sensor device).

As will be further described with respect to FIGS. 4-8, one or more capacitive touch sensor devices employed within a capacitive touch sensor system will each send on a continuous basis during operation of the system what is referred to herein as a measured capacitance signal, which is responsive to changes in the capacitance of the capacitive touch sensor device, to embodiments of the present invention (which may be implemented in hardware, software, or both) configured for recognizing, or detecting, touch and release events. Note that the measured capacitance signal represents a series of samples taken over time, with each sample representing the measured capacitance received from the capacitive touch sensor device during the time period, or cycle, the sample was measured. The frequency of the sampling time periods may be a function of the particular implementation of the system implementing the capacitive touch sensor system, which is not relevant to the enablement of embodiments of the present invention. With respect to descriptions of embodiments of the present invention herein, "N" refers to the current sampling time period, while "N–1" refers to the immediately preceding sampling time period, and so forth.

As has been previously noted herein, depending on the environment in which the capacitive touch sensor system is implemented, this measured capacitance signal may be corrupted by a large spectrum of interferences from electromagnetic noise. The shape and level over time of the measured capacitance signal may significantly depend on the noise level and frequency affecting the system. Embodiments of the present invention more accurately recognize touch and release events from this measured capacitance signal.

Figure 1:
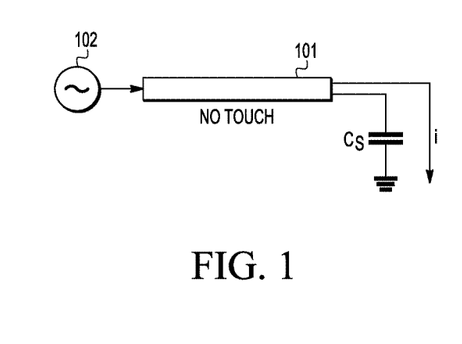
FIG. 1 is an exemplary depiction of a "no touch" instance on an electrode of a capacitive touch sensor device.
Figure 2:
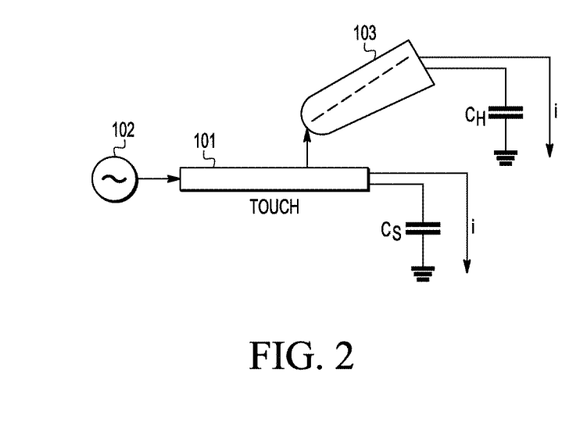
FIG. 2 is an exemplary depiction of a "touch" instance on an electrode of a capacitive touch sensor device.

Some exemplary elements of a capacitive touch sensor device are depicted in FIGS. 1 and 2, though embodiments of the present invention are capable of functioning effectively with measured capacitance signals from any type of known hardware design for such capacitive touch sensor devices. Referring to FIG. 1, the capacitance level of a capacitive touch sensor device electrode 101 may be energized by an appropriate energy source 102 (e.g., a relaxation oscillator), which is capable of driving a predetermined charging current, i, to the electrode 101 so that the electrode 101 has a predetermined capacitance, $C_S$, during time periods when the capacitive touch sensor device is in a "no touch" state.

Referring to FIG. 2, during a touch event, an object 103 (e.g., a human finger or stylus) touches, or comes within a sufficient proximity to, the capacitive touch sensor device electrode 101, resulting in an increase in the capacitance of the electrode 101 to ground. An increase in the capacitance during such a touch event is depicted in FIG. 2 as the addition of the capacitance of the object, $C_H$, to the previously energized capacitance, $C_S$.

Herein, a touch event may refer to the instance illustrated in FIG. 2, while a "no touch" or release event may refer to the instance illustrated in FIG. 1.

Figure 3:
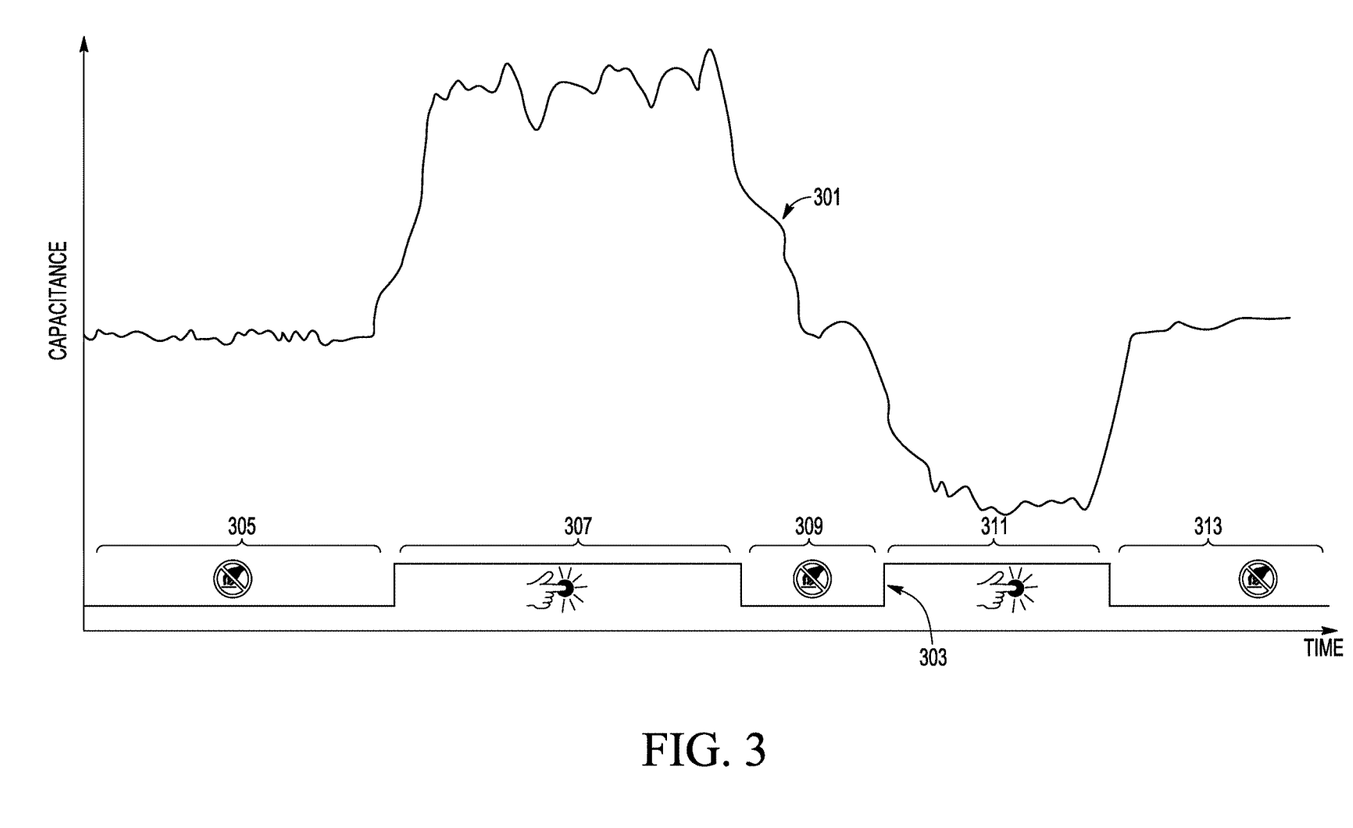
FIG. 3 illustrates an example of measured capacitance signals generated as a function of time during which exemplary touch and release events have occurred.

FIG. 3 illustrates an example of how a measured capacitance signal 301 responds over time to exemplary touch and release events 303. As can be seen in FIG. 3, the measured capacitance signal 301 has a capacitance that is at a first level during a release, or "no touch," event 305, and then increases to a relative second level during a touch event 307. The capacitance level during the release, or "no touch," event 305 of the measured capacitance signal may be determined as a function of the capacitance $C_S$ shown in FIG. 1. The capacitance of the measured capacitance signal at the second relative level during the touch event 307 may be determined as a function of the combination of the capacitances $C_S$ and $C_H$ shown in FIG. 2.

FIG. 3 further depicts how this measured capacitance signal 301 then decreases during the release event 309, during which time period the effective capacitance of the capacitive touch sensor device electrode 101 returns to the approximate capacitance $C_S$. It is during this time period that the energy source 102 reenergizes the capacitance of the electrode 101. This time period may also include a recovery period of the capacitance to $C_S$ so that the capacitive touch sensor device is then ready to sense a subsequent touch event 311. FIG. 3 then further illustrates an example of such a subsequent touch event 311, and how the measured capacitance signal 301 responds thereto, along with a then subsequent second release event 313.

Note that FIG. 3 illustrates these exemplary touch and release events 303 with the measured capacitance signal 301 having a different polarity during the touch event 311 than during the touch event 307 in order to demonstrate that embodiments of the present invention are operable for positive and negative measured capacitance signals resulting from different kinds of touch situations that may be possible within various capacitive touch sensor devices. Thus, embodiments of the present invention are operable with measured capacitance signals that can vary in level, polarity, and offset to zero. Nevertheless, embodiments of the present invention are operable for capacitive touch sensor devices in which the measured capacitance signal results in a positive increase in the measured capacitance signal for each touch event. An example of such a situation will be described hereinafter with respect to FIG. 9.

Also shown in FIG. 3 is how the measured capacitance signal 301 can fluctuate due to factors inherent within the implemented capacitive touch sensor system and the environment in which the system is employed (e.g., electromagnetic noise interference). Furthermore, FIG. 3 shows examples of how such a measured capacitance signal 301 can take some amount of time to increase (i.e., ramp up) and decrease (i.e., ramp down) during the initial stages of touch and release events, respectively. Additionally, FIG. 3 illustrates an example of how such a measured capacitance signal 301 may have an absolute magnitude of its capacitance during a touch event (such as the touch event 311) that is less than the absolute magnitude of the capacitance during an adjoining touch event (such as the touch event 307).

It is these foregoing fluctuations, ramp up, ramp down, and signal magnitudes of a measured capacitance signal that embodiments of the present invention are capable of adapting to in order to more accurately recognize the occurrences of touch and release events, such as the exemplary touch and release events shown by the line 303.

Figure 4:
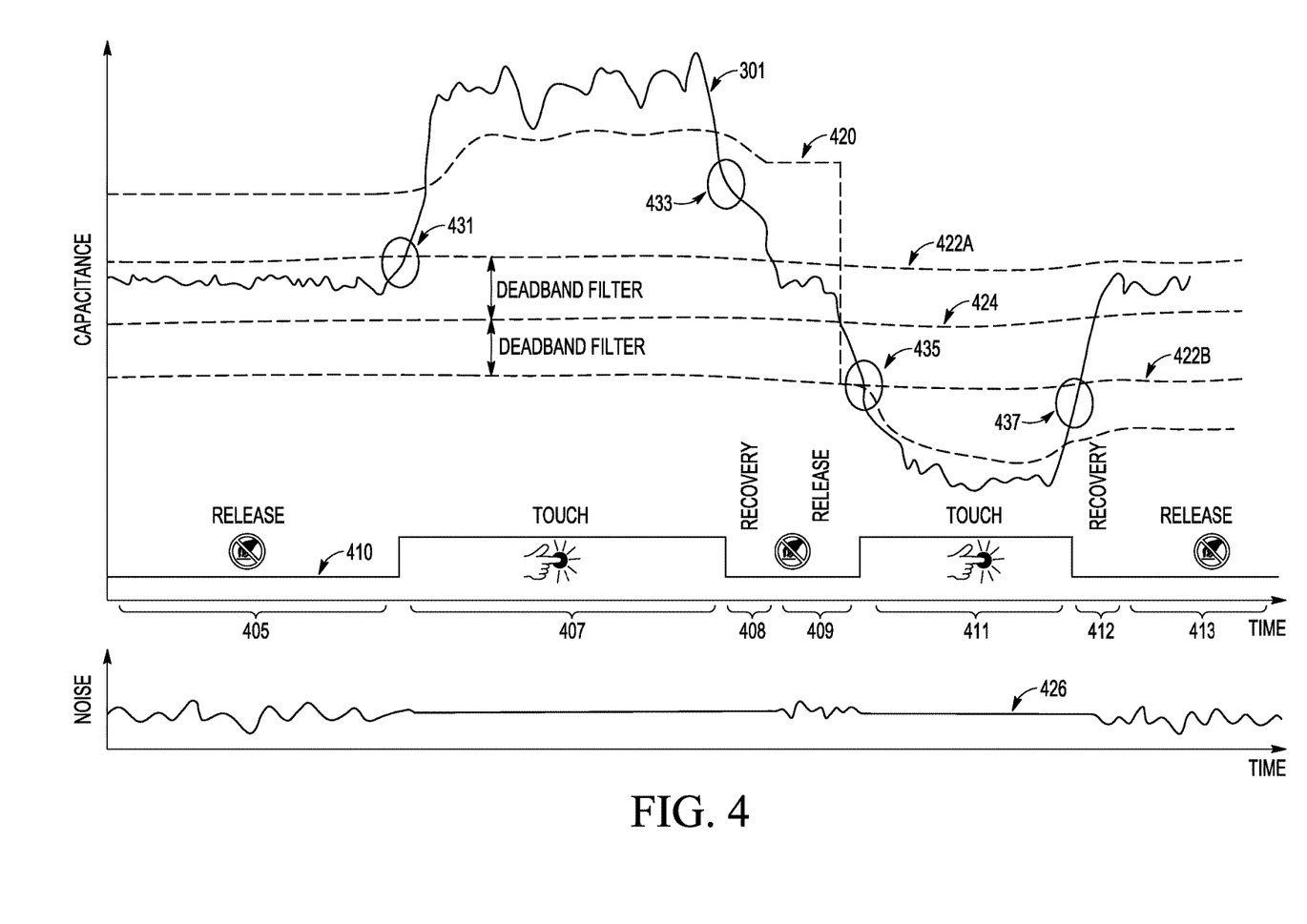
FIG. 4 illustrates examples of various signals utilized within embodiments of the present invention, which are responsive to the exemplary measured capacitance signal illustrated in FIG. 3.

FIG. 4 illustrates how various signals utilized within embodiments of the present invention can be generated in response to receipt of the exemplary measured capacitance signal 301 in order to more accurately recognize, or detect, the touch and release events of a user. Within FIG. 4, the line 410 represents how embodiments of the present invention would recognize occurrences of a user's touch and release events as a function of the received measured capacitance signal generated by the capacitive sensors device responding to such touch and release events. As further described hereinafter with respect to FIGS. 6-8, embodiments of the present invention will generate touch and release event recognitions as represented by the line 410.

For purposes of describing embodiments of the present invention with utilization of the example illustrated in FIG. 4, touch states 407 and 411 represent instances in which embodiments of the present invention have recognized, or detected, a user's touch event (e.g., see FIG. 2), while release state 410, the combination of recovery state 408 and release state 409, and the combination of recovery state 412 and release state 413 represent instances in which embodiments of the present invention have recognized, or detected, a user's "no touch", or release, event (e.g., see FIG. 1).

As will be further described herein, these signals include a predicted signal 420, an adaptive baseline signal 424 (also referred to herein as the "baseline capacitance signal"), a pair of sensitivity threshold limits 422A, 422B (which form what is referred to herein as a "deadband filter"), and a noise signal 426. Note that the sensitivity threshold limit 422B is presented to show how embodiments of the present invention would implement the deadband filter when the measured capacitance signal has dual polarities.

The deadband filter is essentially defined by the capacitance values lying between the sensitivity threshold limit 422A and the adaptive baseline signal 424 (and between the sensitivity threshold limit 422B and the adaptive baseline signal 424 when a capacitive touch sensor device is utilized with dual polarity). In other words, the deadband filter refers to a range of capacitance values calculated from the baseline capacitance signal. Examples of such deadband filters are shown in FIG. 4. Thus, a deadband filter represents the capacitance values within the range bounded by the sensitivity threshold limit 422A and the adaptive baseline signal 424. And, in embodiments in which dual polarities of the measured capacitance signal are utilized, the other deadband filter represents the capacitance values within the range bounded by the sensitivity threshold limit 422B and the adaptive baseline signal 424. A measured capacitance signal lies within the deadband filter when its capacitance value falls within the range of capacitance values calculated for the deadband filter. Conversely, a measured capacitance signal lies outside of the deadband filter when its capacitance value falls outside of the range of capacitance values calculated for the deadband filter.

Figure 5:
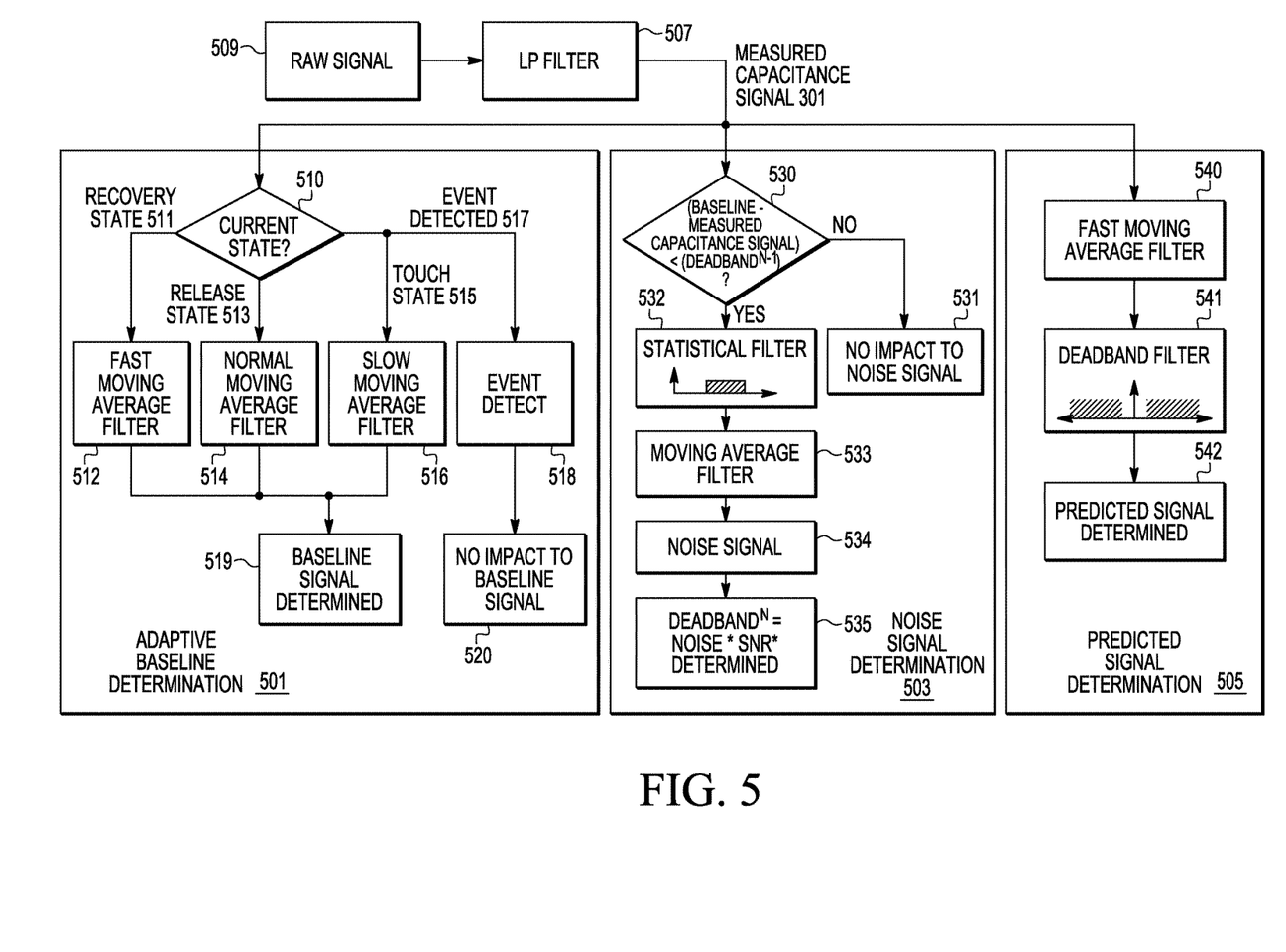
FIG. 5 illustrates signal flow diagrams for determining various signals utilized within embodiments of the present invention.

A recovery state may be predetermined to be a period of time commencing with the recognition of a release event in order to provide time for the system to update the adaptive baseline signal (see process block 512) and sensitivity threshold limits of the deadband filter.

FIG. 5 illustrates signal flow diagrams for generating the signals 420, 422A, 422B, 424, and 426 as a function of the received measured capacitance signal 301. A RAW sample of the measured capacitance signal 509, which may be the measured capacitance signal received from the capacitive touch sensor device in an unprocessed state, may be processed by a low pass ("LP") filter 507 (e.g., an infinite impulse response filter), such as for attenuating high frequency noise within the RAW sample 509. As has been previously noted, the measured capacitance signal 301 represents a series of N samples of received capacitance values measured from a capacitive touch sensor device (e.g., see FIGS. 1-2) over a period of time. This measured capacitance signal 301 is then processed by an adaptive baseline determination process 501, a noise signal determination process 503, and a predicted signal determination process 505. The processes 501, 503, and 505 may be performed substantially in parallel with each other.

The adaptive baseline determination process 501 begins by determining the current state 510 of the capacitive touch sensor device from which the measured capacitance signal 301 emanates. The current state may be determined by accessing a storage register in which the current state has been stored based on a previous determination by the system from a previous measured capacitance signal sample. For example, the process 600, described hereinafter with respect to FIG. 6, may have determined that the capacitive touch sensor device is currently in a touch state 515, and recorded the touch state 515 in the storage register. A recovery state 511 may be determined as occurring during a predetermined period of time commencing upon recognition of a release event by the process 600. The release state 513 may then be determined to commence at the end of the recovery state 511. A storage register may also record the instances when the process 600 detects either a touch or a release event 517. This particular storage register can then be accessed by the process block 510 to determine if an event had just been recognized.

If the adaptive baseline determination process 501 determines that the capacitive touch sensor device is currently in a recovery state 511 (e.g., recovery states 408, 412), then the measured capacitance signal 301 may be processed with a "fast" moving average ("MA") filter 512. If the adaptive baseline determination process 501 determines that the capacitive touch sensor device is currently in a release state 513 (e.g., release states 405, 409, 413), then the measured capacitance signal 301 may be processed by a "normal" moving average filter 514. If the adaptive baseline determination process 501 determines that the capacitive touch sensor device is currently in a touch state 515 (e.g., touch states 407, 411), then the measured capacitance signal 301 may be processed by a "slow" moving average filter 516. An object of the foregoing MA filters is to update a baseline capacitance value that is output by the capacitive touch sensor device when untouched.

Within the following descriptions, reference is made to processing of signals (i.e., signal samples) with various relative levels of moving average filters. A moving average filter is commonly used with time series data to smooth out short-term fluctuations and highlight longer-term trends or cycles. However, any appropriate filters known in the art for performing a transfer function on time series data (e.g., to smooth out short-term fluctuations and highlight longer-term trends or cycles) may be utilized within embodiments of the present invention in place of the moving average filters, as long as they are implemented with the relative filtering, or transfer function, speeds, which may be noted herein as "slow," "normal," and "fast." For example, a "fast" moving average filter may be configured to implement a transfer function of:

$$F1_N=(X_N+(19*F1_{N-1}))/20$$

while a "normal" moving average filter may be configured to implement a slower transfer function of:

$$F1_N=(X_N+(199*F1_{N-1}))/200$$

while a "slow" moving average filter may be configured to implement an even slower transfer function of:

$$F1_N=(X_N+(1999*F1_{N-1}))/2000$$

Thus, within embodiments of the present invention, a certain filter, or filtering, of a signal will be configured to perform a transfer function on the signal at a slower or faster speed relative to another filter, or filtering. As such, the transfer function creates a filtered version of the signal, sometimes referred to herein as simply the filtered signal.

Returning to FIG. 5, whichever one of the process blocks 512, 514, 516 is selected, the adaptive baseline signal 424 is determined 519 (i.e., the baseline capacitance signal is updated) as an output of an application of its respective moving average filter to the sample of the measured capacitance signal 301. An example of this determination can be seen in FIG. 4, which shows how the adaptive baseline signal 424 is updated over time as a function of the processing of the measured capacitance signal 301 by one of the moving average filters 512, 514, 516. Updates to the adaptive baseline signal may be referred to herein as creating a filtered signal in process block 519.

Effectively, the adaptive baseline determination process 501 performs a process of dynamically tracking and updating a level of the adaptive baseline signal 424 with a filter, wherein a transfer function of the filter varies as a function of the current state of the capacitive touch sensor device. The various moving average filters described herein may be implemented with the same type of filter (or even the same filter) but with different coefficient settings for implementing the various relative speeds of the transfer functions of the filter. During a release state 513, it may be desired for the normal moving average filter 514 to have a transfer function configured to more accurately track the measured capacitance signal 301 in order to more accurately track any noise that is affecting the measured capacitance signal. The slow moving average filter 516 may have a transfer function configured to track the measured capacitance signal 301 at a slower speed than the normal moving average filter 514 so that the adaptive baseline signal 424 is held steady so that elevated values due to user interaction with the capacitive touch sensor device (i.e., touch events) do not skew the baseline capacitance value calculation. Because the adaptive baseline signal 424 does drift somewhat to follow the measured capacitance signal 301 during touch events, a fast moving average filter 512 may then be utilized during a recovery state 511 in order to recover the adaptive baseline signal 424 back to the release state levels. In embodiments of the present invention, the fast moving average filter 512 may have a transfer function configured to track the measured capacitance signal 301 at a faster speed than the normal moving average filter 514. A reason why a slow moving average filter 516 may be utilized during a touch event is to provide minor updates to the adaptive baseline signal 424 as a safety feature for the capacitive touch sensor device for protecting against unwanted situations in which the capacitive touch sensor device is in a locked up state (e.g., during a touch event, it recognizes it as a release event, or vice versa).

Figure 7:
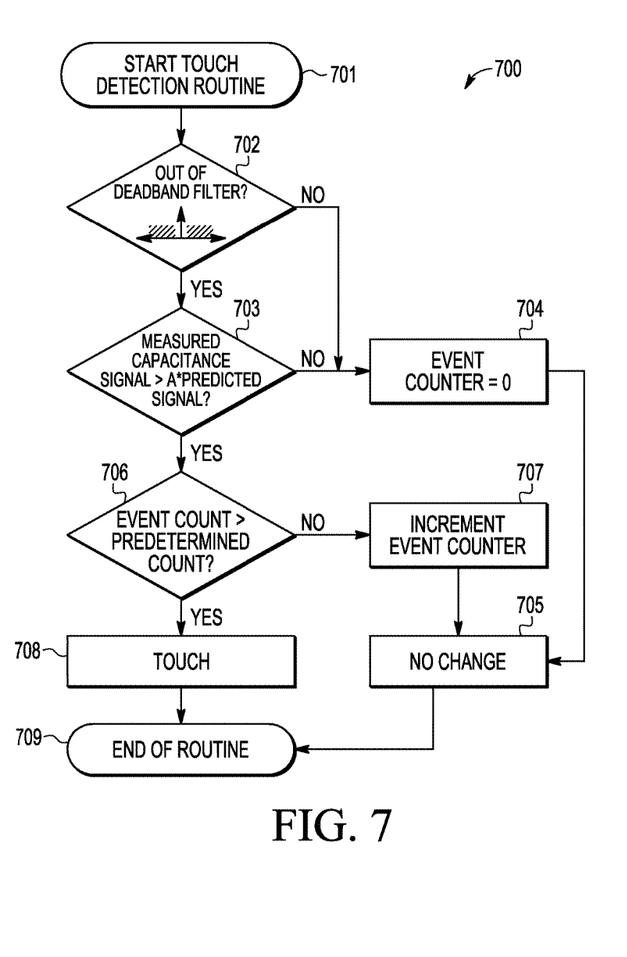
FIG. 7 illustrates a touch detection routine configured in accordance with embodiments of the present invention.

In process block 518, there is no impact, or change, made in process block 520 to the baseline signal during detection of an event, because the process 700 may still be in a situation where it is determining whether a touch event actually occurred (e.g., during incrementing of the event counter), and therefore updating of the adaptive baseline signal 424 may be inhibited during such a non-stable micro-state. An example of such a non-stable micro-state is the occurrence of a very fast touch and release of the user's finger to the capacitive touch sensor device, whereby the process 700 begins to recognize a touch event, but terminates a complete recognition of the touch event. Therefore, inhibiting updating of the adaptive baseline signal 424 during event detection 518 can prevent the slow drift of the adaptive baseline signal 424 from a more accurate level. An example of the operation of process blocks 518, 520 is shown in the example of FIG. 4 where there is no change to the adaptive baseline signal 424 during the time periods where there is the detection of an event (such events are indicated by the circles 431, 433, 435, and 437 in FIG. 4).

The noise signal determination process 503 receives the measured capacitance signal 301 and determines in process block 530 whether a difference between the baseline signal (determined in process block 519) and the measured capacitance signal 301 is less than an absolute capacitance value of the previous (i.e., N−1) measured capacitance signal. Essentially, process block 530 makes no impact to (i.e., does not update) the noise signal (see process block 531) when the measured capacitance signal 301 lies outside of the range of the deadband filter determined in the previous cycle (i.e., N−1) from the previous measured capacitance signal. If the difference between the capacitance value of the determined baseline signal and the received measured capacitance signal 301 is less than the previous deadband signal, then the process proceeds to signal limit the measured capacitance signal 301 in process block 532, such as by truncating the measured capacitance signal 301 with a statistical filter. Such a statistical filter 532 may be utilized when the sample of the measured capacitance signal 301 is significantly out of range of expected values for the implemented design of the capacitive touch sensor device. Furthermore, ignoring signal samples lying outside of the range of the deadband filter can remove certain noise signals from erroneously affecting the determined noise signal 534. The statistical filter 532 can thus operate as a burst cancellation, including alleviating the effects of electrostatic discharge.

The output from the process block 532 results in the signal-limited measured capacitance signal being processed by a moving average filter 533 for creating the noise signal 534. The moving average filter 533 may have a transfer function configured with a speed similar to that of the normal moving average filter 514, since it may be desired to have the determined noise signal 534 more accurately track the measured capacitance signal 301 during instances when the measured capacitance signal 301 lies within the range of the deadband filter, and thus is near the more stable capacitance values associated with a release state of the capacitive touch sensor device. An example of such a noise signal 534 is represented in FIG. 4 as the noise signal 426.

In process block 535, an update to the deadband filter is determined, or calculated, by multiplying the noise signal 534 by a predetermined signal-to-noise ratio, which may have been previously inputted into the system by the manufacturer, or may be preselected by the user. Non-limiting examples of the signal to noise ratio is that it may be two times larger than the deadband filter range, or it may be designated to have a minimum of a certain decibel level.

An example of how the deadband filter is created in operation can be seen in the example of FIG. 4 where the sensitivity threshold limits 422A and 422B vary (i.e., are updated) over time. The width of the range of the deadband filter (that is, the level of the sensitivity threshold limit 422A above the adaptive baseline signal 424 (and the level of the sensitivity threshold limit 422B below the adaptive baseline signal 424 when dual polarity is utilized)) is determined as a function of the predetermined signal-to-noise ratio that is multiplied with the noise signal 534. Note that during the touch states 407 and 411 and the recovery state 408, there is no change in the noise signal 426 from its previous determination, as created in process block 531 where no impact is made (i.e., no update) to the new noise signal (see process block 531) when the measured capacitance signal 301 lies outside of the range of the deadband filter. However, changes were made to the noise signal 426 during the release state 412, because the measured capacitance signal was lying within the range of the deadband filter.

The predicted signal determination process 505 begins by processing the measured capacitance signal 301 through a fast moving average filter 540. The fast moving average filter 540 may have a transfer function configured to track the measured capacitance signal 301 at a speed that is faster than that of the normal moving average filter 514, because a typical capacitive touch sensor device will spend more time in a release state than in a touch state. If in process block 541 it is determined that the predictive signal as created by the fast moving average filter 540 lies outside of the range of the deadband filter, then a predicted signal determination is output in process block 542. An example of how the predicted signal determination process 505 operates can be seen in the example of FIG. 4 where there is no change (i.e., update) to the predicted signal 420 during those time periods when the measured capacitance signal 301 lies within the range of the deadband filter. Thus, the process 505 operates to maintain the predicted signal 420 out of the range of the deadband filter 540 so that it can more accurately and quickly track instances of touch and release events.

Figure 6:
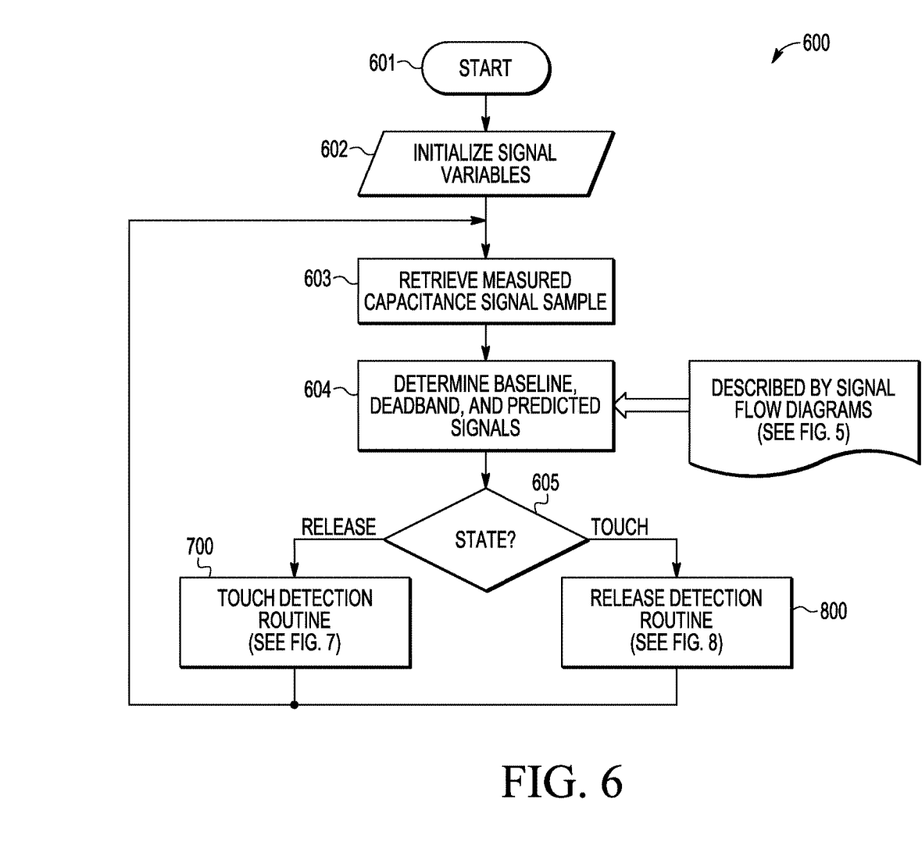
FIG. 6 illustrates a flow diagram configured in accordance with embodiments of the present invention.

Referring now to FIG. 6, there is illustrated a process 600 configured in accordance with embodiments of the present invention, whereby the various signals previously described with respect to FIG. 5 are utilized for recognizing, or detecting, touch and release events based on the signals. The process starts in process block 601, and proceeds to process block 602 for initialization of signal variables. The initialization of signal variables 602 may be performed during the power on or startup of the data processing system implementing the user interface employing the capacitive touch sensor system (see FIG. 10). These signal variables may include various parameters, coefficients, and constants utilized within the various moving average and signal filters previously described with respect to FIG. 5, the count numbers described hereinafter with respect to FIG. 7, and the variables A and B described hereinafter with respect to FIGS. 7 and 8.

Thereafter, the process 600 proceeds to process block 603 to retrieve a sample of the measured capacitance signal 301. In process block 604, the baseline, noise, deadband filter, and predicted signals are determined, as previously described within the signal flow diagrams in FIG. 5. Next, the process 600 determines the current state 605 of the capacitive touch sensor device. In other words, the process 600 determines whether the capacitive touch sensor device has been recognized to be currently in a touch state or a release state. If the process 600 determines that the capacitive touch sensor device is in a release state (e.g., release states 409, 413), it will then process the signals determined in process block 604 using the touch detection routine 700 described hereinafter with respect to FIG. 7. If the capacitive touch sensor device is in a recovery state, the process 600 may be configured to determine this to be equivalent to a release state, and proceed to process the signals using the touch detection routine 700. If it is determined that the capacitive touch sensor device is in a touch state (e.g., touch events 407, 411), then the process 600 will proceed to perform the release detection routine 800 described hereinafter with respect to FIG. 8. After either of these routines is performed, the process 600 will return to process block 603 to perform the foregoing on the next received sample of the measured capacitance signal.

The touch detection routine 700 is now described with respect to FIG. 7. The touch detection routine 700 starts in process block 701 and proceeds to determine whether the received sample of the measured capacitance signal 301 lies within the range of the deadband filter in process block 702.

When it is determined in process block 702 that a received sample of the measured capacitance signal 301 lies outside of the range of the deadband filter, the routine 700 proceeds to process block 703 to determine whether the measured capacitance signal is greater in magnitude than a predetermined percentage (wherein the percentage is less than or equal to 100%) of the predicted signal, which was created in process block 542 previously described with respect to FIG. 5. The amount of the percentage multiplier, A, may be predetermined within the system, including by the user, and may be one of the variables initialized in process block 602 of FIG. 6. As an example, the percentage multiplier, A, may be a percentage between 20% and 30%. If the measured capacitance signal sample is not greater than a percentage of the predicted signal, the routine 700 proceeds to process block 704 to initialize an event counter to zero. The routine 700 then proceeds to process block 705 whereby the routine 700 makes no change in state to a previous determination by the process 600.

If the routine 700 determines in process block 702 that the measured capacitance signal does lie within the range of the deadband filter, then the routine 700 proceeds to process block 704. A result of the foregoing is that a touch event is not recognized if the measured capacitance signal 301 lies within the range of the deadband filter. An example of this is shown in FIG. 4 where the touch states 407 and 411 are not initiated until the measured capacitance signal 301 moves outside of the range of the deadband filter.

If the retrieved measured capacitance signal sample is greater than a percentage of the predicted signal, the routine 700 proceeds to process block 706 to determine if the event count within an event counter is greater than a predetermined count level. This predetermined count level may be designated within the system at manufacturing, or may be user defined, and may be one of the variables initialized in the aforementioned process block 602 of FIG. 6. If the event count is not greater than the predetermined count level, the routine 700 proceeds to process block 707 to increment the event counter by 1, and then proceeds to process block 705 where there is no change in state to the previous determination by the process 600. However, if the event count is determined to be greater than the predetermined count level in process block 706, the routine 700 proceeds to process block 708 to output a recognition, or detection, of a touch event. The process block 708 may also reset the even counter to zero. In the example illustrated in FIG. 4, the recognition of touch events are indicated with the circles 431 and 435.

It should be noted that the previously determined count level may be an integer, N, greater than or equal to zero (e.g., N is greater than 1), such that the counting can continue for a fixed number of clock cycles. The event counter may be implemented as an additional safety filter to assist in ensuring that a touch event is not recognized due to error glitches, such as false touches (for example, when a user quickly touches and releases their finger on the capacitive touch sensor device).

Referring again to the example illustrated in FIG. 4, it can be seen that the touch event recognition 431 is determined by the routine 700 to occur when the magnitude of the measured capacitance signal 301 is greater than a predetermined percentage of the magnitude of the predicted signal 420, and the measured capacitance signal 301 lies outside of the range of the deadband filter. Thus, depending on the amount of the percentage multiplier, A, and the predetermined count level, the touch event recognition 431 can be determined to occur anywhere along the measured capacitance signal 301 from when it has risen to a level greater than the sensitivity threshold limit 422A and where a magnitude of the measured capacitance signal 301 crosses with the predicted signal 420. Note that since the measured capacitance signal 301 crosses the predicted signal 420 just as it has increased in absolute magnitude below the sensitivity threshold limit 422B, the touch event recognition 435 is determined to occur at that location, in this particular example.

Figure 8:
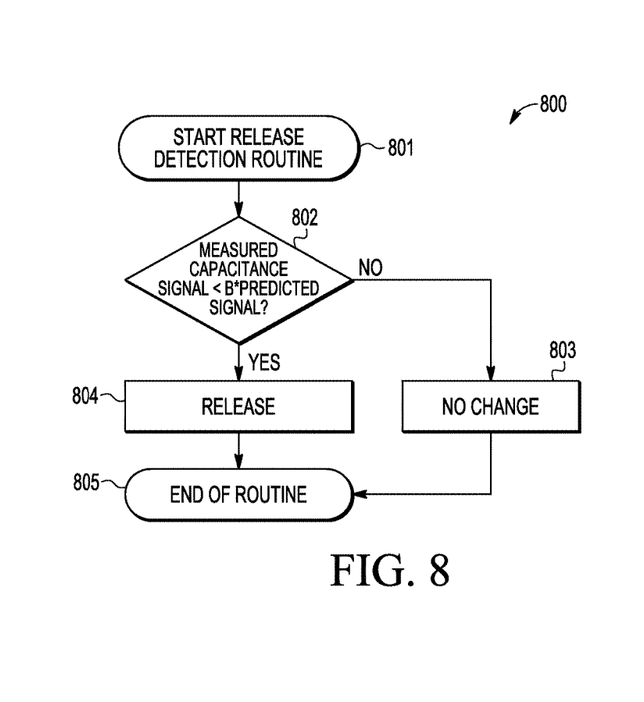
FIG. 8 illustrates a release detection routine configured in accordance with embodiments of the present invention.

Referring now to FIG. 8, there is illustrated the release detection routine 800 for determining the recognition, or detection, of a release event, which are shown as release event recognitions 433 and 437 in the example of FIG. 4. The release detection routine 800 starts in process block 801, and determines in process block 802 whether the received sample of the measured capacitance signal 301 has a magnitude less than a predetermined percentage (wherein the percentage is less than or equal to 100%) of the predicted signal, where this percentage is indicated in process block 802 as the percentage multiplier, B. This percentage multiplier, B, may be predetermined within the system, or may be user defined, and may be one of the initialized variables in process block 602. As an example, the percentage multiplier, B, may be between 70% and 80% in embodiments of the present invention. If in process block 802, the received measured capacitance signal is not less than a percentage of the predicted signal, the routine 800 proceeds to process block 803 to make no change in the previously determined state by the process 600. In other words, if the state of the capacitive touch sensor device is in a touch state, then it will remain in this touch state as the routine 800 proceeds to the end of the routine in process block 805. If the received measured capacitance signal sample is less than a percentage of predicted signal in process block 802, then the routine 800 determines that a release event has been recognized, or detected, in process block 804. As can be seen within the example illustrated in FIG. 4, recognition of a release event can be determined to occur at any time when the measured capacitance signal 301 is less in magnitude than the predicted signal 420.

Figure 9:
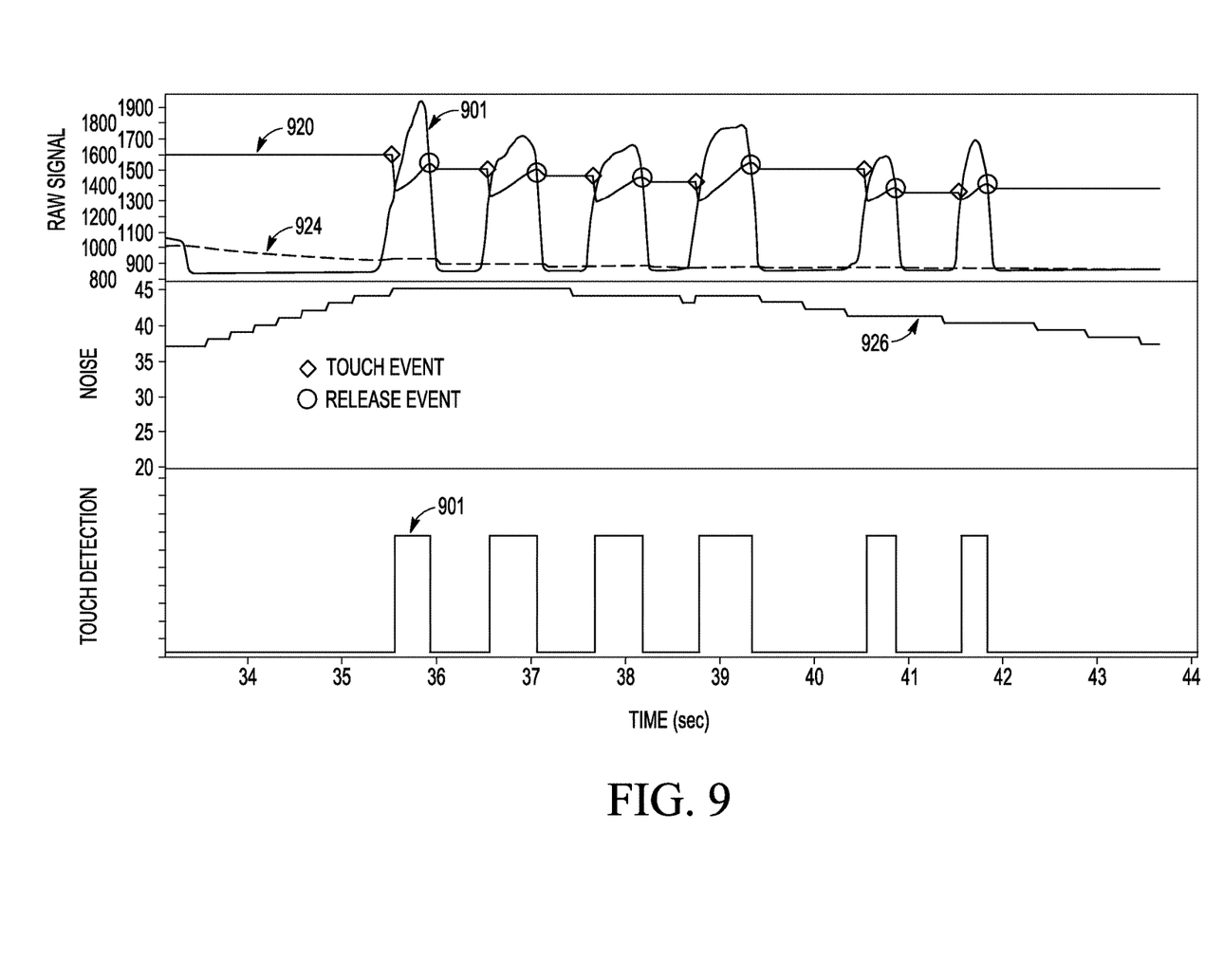
FIG. 9 illustrates an example of test results produced by a system configured in accordance with embodiments of the present invention.

FIG. 9 illustrates a proof of concept of embodiments of the present invention based on measurement results from testing of an exemplary capacitive touch sensor device. Line 901 represents the measured capacitance signal as received in samples over time. The predicted signal as determined within the predicted signal determination process 505 is indicated by the line 920. The adaptive baseline signal as determined within the adaptive baseline determination process 501 is indicated by the line 924. The noise signal as determined in the noise signal determination process 503 is indicated by the line 926. When the process 600 was performed on the measured capacitance signal 901, it resulted in recognition of touch events as represented by the diamonds, ◇, and recognition of release events as represented by the circles, ○.

Figure 10:
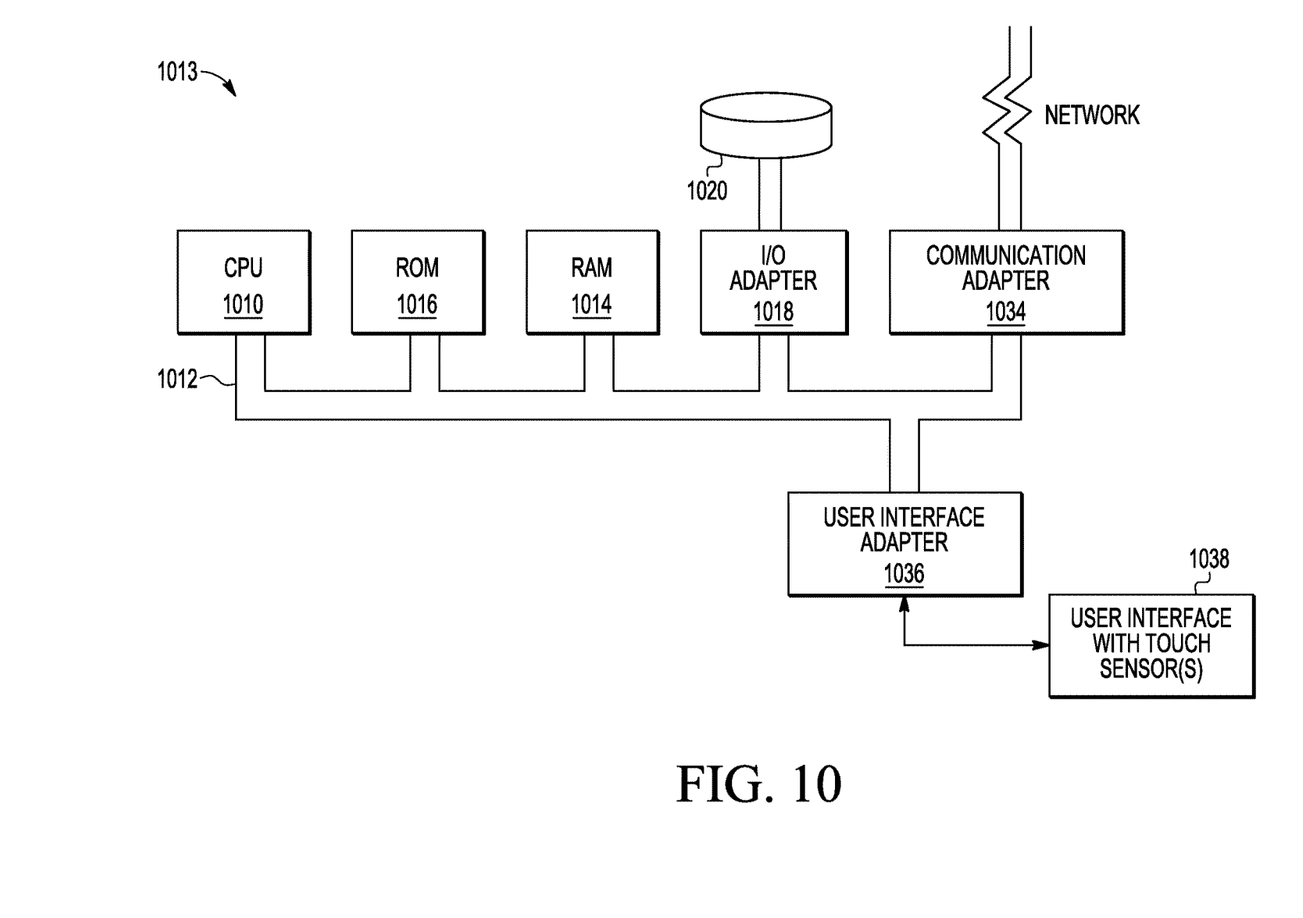
FIG. 10 illustrates a data processing system configured in accordance with embodiments of the present invention.

With reference now to FIG. 10, a block diagram illustrating a data processing system 1013 is depicted in which aspects of embodiments of the invention may be implemented. For example, one or more capacitive touch sensor devices may be implemented within a capacitive touch sensor system utilized for the user interface 1038 for enabling a user to input instructions, etc. into the system 1013. Furthermore, one or more of the processes disclosed in FIGS. 5-8 may be implemented in hardware, software, or both within one or more of the user interface adapter 1036 and processor 1010.

Data processing system 1013 may employ a peripheral component interconnect ("PCI") local bus architecture. Although the depicted example employs a PCI bus 1012, other bus architectures such as PCI Express, Accelerated Graphics Port ("AGP"), and Industry Standard Architecture ("ISA") may be used, among others. Processor ("CPU") 1010, volatile memory ("RAM") 1014, and non-volatile memory ("ROM") 1016 may be connected to PCI local bus 1012 through a PCI Bridge (not shown). The PCI Bridge also may include an integrated memory controller and cache memory for processor 1010. Additional connections to PCI local bus 1012 may be made through direct component interconnection or through add-in boards. In the depicted example, a network communications adapter 1034, small data processing system interface ("SCSI") host bus adapter (not shown), and expansion bus interface (not shown) may be connected to PCI local bus 1012 by direct component connection. In contrast, audio adapter (not shown), graphics adapter (not shown), and audio display adapter (not shown) may be connected to PCI local bus 1012 by add-in boards inserted into expansion slots. A user interface implementing one or more touch sensors (e.g., display device) 1038 may be connected to the PCI local bus by the user interface adapter 1036. An optional I/O adapter 1018 provides a connection for a hard disk drive 1020 and CD-ROM drive (not shown).

An operating system may be run on processor 1010 and used to coordinate and provide control of various components within data processing system 1013. The operating system may be a commercially available operating system. An object oriented programming system such as Java may run in conjunction with the operating system and provide calls to the operating system from Java programs or programs executing on system 1013. Instructions for the operating system, the object-oriented operating system, and programs may be located on non-volatile memory 1016, and/or storage devices, such as a hard disk drive 1020, and may be loaded into volatile memory 1014 for execution by processor 1010.

Those of ordinary skill in the art will appreciate that the hardware in FIG. 10 may vary depending on the implementation. The depicted example in FIG. 10 and above-described examples are not meant to imply architectural limitations. Further, a computer program form of the present invention may reside on any computer readable storage medium (i.e., floppy disk, compact disk, hard disk, tape, ROM, RAM, etc.) used by a data processing system. (The terms "computer," "system," and "data processing system" may be used interchangeably herein.)

As will be appreciated by one skilled in the art, aspects of the processes and routines described with respect to FIGS. 5-8 may be embodied as a system, method, and/or program product (e g, running on system 1013). Accordingly, aspects of the processes and routines described with respect to FIGS. 5-8 may take the form of an entirely hardware embodiment, an entirely software embodiment (including firmware, resident software, micro-code, etc.), or embodiments combining software and hardware aspects that may all generally be referred to herein as a "circuit," "circuitry," "module," or "system." Furthermore, aspects of the processes and routines described with respect to FIGS. 5-8 may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, biologic, atomic, or semiconductor system, apparatus, controller, or device, or any suitable combination of the foregoing. More specific examples (a non-exhaustive list) of the computer readable storage medium may include the following: an electrical connection having one or more wires, a portable computer diskette, a hard disk, a random access memory ("RAM") (e.g., RAM 1014), a read-only memory ("ROM") (e.g., ROM 1016), an erasable programmable read-only memory ("EPROM" or Flash memory), an optical fiber, a portable compact disc read-only memory ("CD-ROM"), an optical storage device, a magnetic storage device (e.g., hard disk drive 1020), or any suitable combination of the foregoing. In the context of this document, a computer readable storage medium may be any tangible medium that can contain or store a program for use by or in connection with an instruction execution system, apparatus, controller, or device. Program code embodied on a computer readable signal medium may be transmitted using any appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, controller, or device.

The flow diagrams and block diagrams in the figures illustrate architecture, functionality, and operation of possible implementations of systems, methods and program products according to various embodiments of the present invention. In this regard, each block in the flow diagrams or block diagrams may represent a module, segment, or portion of code, which comprises one or more executable program instructions for implementing the specified logical function(s). It should also be noted that, in some implementations, the functions noted in the blocks may occur out of the order noted in the figures. For example, two blocks shown in succession may, in fact, be executed substantially concurrently, or the blocks may sometimes be executed in the reverse order, depending upon the functionality involved.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented that achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations, and operations may be executed at least partially overlapping in time. Moreover, alternative embodiments may include multiple instances of a particular operation, and the order of operations may be altered in various other embodiments.

Modules implemented in software for execution by various types of processors (e.g., processor 1010) may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The data may provide electronic signals on a system (e.g., system 1013) or network.

These program instructions may be provided to a processor (e.g., processor 1010) and/or controller of a general purpose computer, special purpose computer, or other programmable data processing apparatus (e.g., controller) to produce a machine (e.g., system 1013), such that the instructions, which execute via the processor of the computer or other programmable data processing apparatus, create means for implementing the functions/acts specified in a flow diagram or block diagram block or blocks.

It will also be noted that each block of the block diagram and flow diagram illustrations, and combinations of blocks in the block diagram and flow diagram illustrations, can be implemented by special purpose hardware-based systems that perform the specified functions or acts, or combinations of special purpose hardware and computer instructions. For example, a module may be implemented as a hardware circuit comprising custom VLSI circuits or gate arrays, off-the-shelf semiconductors such as logic chips, transistors, controllers, or other discrete components. A module may also be implemented in programmable hardware devices such as field programmable gate arrays, programmable array logic, programmable logic devices, or the like.

Computer program code, i.e., instructions, for carrying out operations for aspects of the processes and routines described with respect to FIGS. 5-8 may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on a user's computer, as a stand-alone software package, partly on a user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

These program instructions may also be stored in a computer readable storage medium that can direct a computer, other programmable data processing apparatus, controller, or other devices to function in a particular manner, such that the instructions stored in the computer readable medium produce an article of manufacture including instructions which implement the function/act specified in the flowchart and/or block diagram block or blocks.

The program instructions may also be loaded onto a computer, other programmable data processing apparatus, controller, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects of the present disclosure provide a method for performing touch detection within a capacitive touch sensor system, wherein the system receives a measured capacitance signal from a capacitive touch sensor device, updates a baseline capacitance signal by performing a first filtering of the measured capacitance signal, wherein a transfer function of the first filtering varies as a function of a current state of the capacitive touch sensor device, performs a second filtering of the measured capacitance signal to create a noise signal, creates a deadband filter as a function of the noise signal, performs a third filtering of the measured capacitance signal to create a predicted signal, and recognizes a touch event or a release event of the capacitive touch sensor device as a function of a comparison of the predicted signal to the measured capacitance signal when the measured capacitance signal lies outside of a range of the deadband filter. The touch event of the capacitive touch sensor device may be recognized if the capacitive touch sensor device is in the release state, and the measured capacitance signal is greater than a predetermined percentage of the predicted signal, wherein the predetermined percentage may be less than or equal to 100%. The release event of the capacitive touch sensor device is recognized if (1) the capacitive touch sensor device is in the touch state, and (2) the measured capacitance signal is less than a predetermined percentage of the predicted signal, wherein the predetermined percentage may be less than or equal to 100%. The predicted signal may be utilized for the recognizing step if the predicted signal lies outside of the range of the deadband filter. The updating of the baseline capacitance signal may further comprises performing a fourth filtering of the measured capacitance signal to create a first filtered signal if the capacitive touch sensor device is in a touch state, performing a fifth filtering of the measured capacitance signal to create a second filtered signal if the capacitive touch sensor device is in a release state, and performing a sixth filtering of the measured capacitance signal to create a third filtered signal if the capacitive touch sensor device is in a recovery state. The fourth filtering may be configured to perform a relatively slower transfer function on the measured capacitance signal than the fifth filtering. The second filtering may be configured to perform a relatively faster transfer function on the measured capacitance signal than the fourth filtering. The sixth filtering may be configured to perform a relatively faster transfer function on the measured capacitance signal than the fifth filtering. The baseline capacitance signal may be updated with the first filtered signal if the capacitive touch sensor device is in the touch state, wherein the baseline capacitance signal may be updated with the second filtered signal if the capacitive touch sensor device is in the release state, and wherein the baseline capacitance signal may be updated with the third filtered signal if the capacitive touch sensor device is in the recovery state. The method may further comprise inhibiting updating of the measured capacitance signal for a period of time when the touch event has been recognized. The creation of the deadband filter may further comprise multiplying the noise signal by a signal-to-noise ratio. The first, second, third, fourth, fifth, and sixth filterings may be each performed by a moving average filter. The touch event may be recognized when the measured capacitance signal is greater than a predetermined percentage of the predicted signal during N consecutive samples of the measured capacitance signal, wherein N is greater than 1.

Aspects of the present disclosure provide a capacitive touch sensor system that comprises one or more capacitive touch sensor devices, each sending a measured capacitance signal that outputs a baseline capacitance signal during a release event, and outputs an increased capacitance signal during a touch event, circuitry for updating the baseline capacitance signal with a filter, wherein a transfer function of the filter varies as a function of a current state of the capacitive touch sensor device, circuitry for determining a range of capacitance values calculated from the baseline capacitance signal in which a recognition of the touch event will not be performed, circuitry for creating a predicted signal from a filtered version of the measured capacitance signal, and circuitry for recognizing the touch event or the release event as a function of a comparison of the measured capacitance signal to the predicted signal. The circuitry for recognizing the touch event or the release event may further comprise circuitry for recognizing the touch event when a magnitude of the measured capacitance signal is greater than a percentage of a magnitude the predicted signal, wherein the percentage is less than or equal to 100%. The system may further comprise circuitry for preventing the recognition of the touch event when the measured capacitance signal lies within the range of capacitance values calculated from the baseline capacitance signal. The circuitry for recognizing the touch event or the release event may further comprise circuitry for recognizing the release event when a magnitude of the measured capacitance signal is less than a percentage of the predicted signal, wherein the percentage is less than or equal to 100%. The circuitry for determining the range of capacitance values calculated from the baseline capacitance signal in which the recognition of the touch event will not be performed may further comprise circuitry for calculating the range of capacitance values as a function of a noise signal created from a filtered version of the measured capacitance signal when the measured capacitance signal lies within a capacitance value range calculated from a previously determined baseline capacitance signal derived from a previous measured capacitance signal sample. The circuitry for updating the baseline capacitance signal with the filter may further comprise circuitry for updating the baseline capacitance signal with a first filter having a first transfer function when the capacitive touch sensor device is in a touch state, circuitry for updating the baseline capacitance signal with a second filter having a second transfer function when the capacitive touch sensor device is in a release state, and circuitry for updating the baseline capacitance signal with a third filter having a third transfer function when the capacitive touch sensor device is in a recovery state. The recovery state may be determined as a period of time commencing with the recognition of the release event, wherein a release state commences at an end of the recovery state. The third transfer function of the third filter may be configured to be faster than the second transfer function of the second filter, and wherein the second transfer function of the second filter may be configured to be faster than the first transfer function of the first filter.

Reference throughout this specification to "one embodiment," "embodiments," or similar language means that a particular feature, structure, or characteristic described in connection with the embodiments is included in at least one embodiment of the present invention. Thus, appearances of the phrases "in one embodiment," "in an embodiment," "embodiments," and similar language throughout this specification may, but do not necessarily, all refer to the same embodiment. Furthermore, the described features, structures, aspects, and/or characteristics of the invention may be combined in any suitable manner in one or more embodiments. Correspondingly, even if features may be initially claimed as acting in certain combinations, one or more features from a claimed combination can in some cases be excised from the combination, and the claimed combination can be directed to a sub-combination or variation of a sub-combination.

In the descriptions herein, numerous specific details are provided, such as examples of capacitive touch device elements, capacitance signals, touch events, release events, programming, software modules, user selections, network transactions, database queries, database structures, hardware modules, hardware circuits, hardware chips, controllers, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations may be not shown or described in detail to avoid obscuring aspects of the invention.

Benefits, advantages and solutions to problems have been described above with regard to specific embodiments. However, the benefits, advantages, solutions to problems, and any element(s) that may cause any benefit, advantage, or solution to occur or become more pronounced may be not to be construed as critical, required, or essential features or elements of any or all the claims.

Those skilled in the art having read this disclosure will recognize that changes and modifications may be made to the embodiments without departing from the scope of the present invention. It should be appreciated that the particular implementations shown and described herein may be illustrative of the invention and its best mode and may be not intended to otherwise limit the scope of the present invention in any way. Other variations may be within the scope of the following claims.

While this specification contains many specifics, these should not be construed as limitations on the scope of the invention or of what can be claimed, but rather as descriptions of features specific to particular implementations of the invention. Headings herein may be not intended to limit the invention, embodiments of the invention, or other matter disclosed under the headings.

Herein, the term "or" may be intended to be inclusive, wherein "A or B" includes A or B and also includes both A and B.

The terminology used herein is for the purpose of describing particular embodiments only and is not intended to be limiting of the invention. As used herein, the singular forms "a," "an," and "the" may be intended to include the plural forms as well, unless the context clearly indicates otherwise. It will be further understood that the terms "comprises" and/or "comprising," when used in this specification, which may include the claims herein below, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below may be intended to include any structure, material, or act for performing the function in combination with other claimed elements as specifically claimed.

What is claimed is:

1. A method for performing touch detection within a capacitive touch sensor system, comprising:
    receiving a measured capacitance signal from a capacitive touch sensor device;
    updating a baseline capacitance signal by performing a first filtering of the measured capacitance signal, wherein a transfer function of the first filtering varies as a function of a current state of the capacitive touch sensor device;
    performing a second filtering of the measured capacitance signal to create a noise signal;
    creating a deadband filter as a function of the noise signal;
    performing a third filtering of the measured capacitance signal to create a predicted signal; and
    recognizing a touch event or a release event of the capacitive touch sensor device as a function of a comparison of the predicted signal to the measured capacitance signal when the measured capacitance signal lies outside of a range of the deadband filter.

2. The method as recited in claim 1, wherein the touch event of the capacitive touch sensor device is recognized when (1) the capacitive touch sensor device is in a release state, and (2) the measured capacitance signal is greater than a predetermined percentage of the predicted signal.

3. The method as recited in claim 1, wherein the release event of the capacitive touch sensor device is recognized when (1) the capacitive touch sensor device is in a touch state, and (2) the measured capacitance signal is less than a predetermined percentage of the predicted signal.

4. The method as recited in claim 1, wherein the predicted signal is utilized for the recognizing of the touch event or the release event of the capacitive touch sensor device when the predicted signal lies outside of the range of the deadband filter.

5. The method as recited in claim 1, wherein the updating of the baseline capacitance signal further comprises:
    performing a fourth filtering of the measured capacitance signal to create a first filtered signal when the capacitive touch sensor device is in a touch state;
    performing a fifth filtering of the measured capacitance signal to create a second filtered signal when the capacitive touch sensor device is in a release state; and
    performing a sixth filtering of the measured capacitance signal to create a third filtered signal when the capacitive touch sensor device is in a recovery state.

6. The method as recited in claim 5, wherein the fourth filtering is configured to perform a relatively slower transfer function on the measured capacitance signal than the fifth filtering.

7. The method as recited in claim 6, wherein the second filtering is configured to perform a relatively faster transfer function on the measured capacitance signal than the fourth filtering.

8. The method as recited in claim 6, wherein the sixth filtering is configured to perform a relatively faster transfer function on the measured capacitance signal than the fifth filtering.

9. The method as recited in claim 5, wherein the baseline capacitance signal is updated with the first filtered signal when the capacitive touch sensor device is in the touch state, wherein the baseline capacitance signal is updated with the second filtered signal when the capacitive touch sensor device is in the release state, and wherein the baseline capacitance signal is updated with the third filtered signal when the capacitive touch sensor device is in the recovery state.

10. The method as recited in claim 1, further comprising inhibiting updating of the measured capacitance signal for a period of time when the touch event has been recognized.

11. The method as recited in claim 1, wherein the creating of the deadband filter further comprises multiplying the noise signal by a signal-to-noise ratio.

12. The method as recited in claim 2, wherein the predetermined percentage is less than or equal to 100%.

13. The method as recited in claim 3, wherein the predetermined percentage is less than or equal to 100%.

14. The method as recited in claim 5, wherein the first, second, third, fourth, fifth, and sixth filterings are each performed by a moving average filter.

15. The method as recited in claim 2, wherein the touch event is recognized when the measured capacitance signal is greater than a predetermined percentage of the predicted signal during N consecutive samples of the measured capacitance signal, wherein N is greater than 1.

16. A capacitive touch sensor system, comprising:
one or more capacitive touch sensor devices, each sending a measured capacitance signal that outputs a baseline capacitance signal during a release event, and outputs an increased capacitance signal during a touch event;
circuitry for updating the baseline capacitance signal with a filter, wherein a transfer function of the filter varies as a function of a current state of the capacitive touch sensor device;
circuitry for determining a range of capacitance values as a function of a noise signal calculated from the baseline capacitance signal in which a recognition of the touch event will not be performed;
circuitry for creating a predicted signal from a filtered version of the measured capacitance signal; and
circuitry for recognizing the touch event or the release event as a function of a comparison of the measured capacitance signal to the predicted signal.

17. The system as recited in claim 16, wherein the circuitry for recognizing the touch event or the release event further comprises circuitry for recognizing the touch event when a magnitude of the measured capacitance signal is greater than a percentage of a magnitude the predicted signal, wherein the percentage is less than or equal to 100%.

18. The system as recited in claim 17, further comprising circuitry for preventing the recognition of the touch event when the measured capacitance signal lies within the range of capacitance values calculated from the baseline capacitance signal.

19. The system as recited in claim 16, wherein the circuitry for recognizing the touch event or the release event further comprises circuitry for recognizing the release event when a magnitude of the measured capacitance signal is less than a percentage of the predicted signal, wherein the percentage is less than or equal to 100%.

20. The system as recited in claim 16, wherein the noise is signal created from a filtered version of the measured capacitance signal when the measured capacitance signal lies within a capacitance value range calculated from a previously determined baseline capacitance signal derived from a previous measured capacitance signal sample,
wherein the circuitry for updating the baseline capacitance signal with the filter further comprises:
circuitry for updating the baseline capacitance signal with a first filter having a first transfer function when the capacitive touch sensor device is in a touch state;
circuitry for updating the baseline capacitance signal with a second filter having a second transfer function when the capacitive touch sensor device is in a release state; and
circuitry for updating the baseline capacitance signal with a third filter having a third transfer function when the capacitive touch sensor device is in a recovery state, and
wherein the recovery state is determined as a period of time commencing with the recognition of the release event, wherein a release state commences at an end of the recovery state,
wherein the third transfer function of the third filter is configured to be faster than the second transfer function of the second filter, and wherein the second transfer function of the second filter is configured to be faster than the first transfer function of the first filter.

* * * * *